United States Patent [19]

Voelkerding

[11] Patent Number: 4,787,280
[45] Date of Patent: Nov. 29, 1988

[54] APPARATUS FOR MACHINING WORKPIECES AND METHOD THEREFOR

[75] Inventor: Bruce D. Voelkerding, Lakewood, Ohio

[73] Assignee: The Warner & Swasey Company, Cleveland, Ohio

[21] Appl. No.: 889,987

[22] Filed: Jul. 24, 1986

[51] Int. Cl.$^4$ ............................................. B23B 13/00
[52] U.S. Cl. ........................................ 82/2.5; 82/2.7; 82/36 A
[58] Field of Search .................... 82/2.5, 2.7, 36 A; 29/563, 564, 27 R; 198/346.2, 346.3, 339.1; 414/222, 225, 226

[56] References Cited

U.S. PATENT DOCUMENTS

| | | | |
|---|---|---|---|
| Re. 29,612 | 4/1978 | Fullerton | 82/36 A |
| 4,161,849 | 7/1979 | Voumard et al. | |
| 4,316,398 | 2/1982 | Link et al. | 82/2.7 |
| 4,317,394 | 3/1982 | Link et al. | 82/2.5 |

*Primary Examiner*—Frederick R. Schmidt
*Assistant Examiner*—Lawrence Cruz
*Attorney, Agent, or Firm*—Calvin G. Covell; Raymond J. Eifler

[57] ABSTRACT

During operation of an apparatus to machine a workpiece, an unfinished workpiece is gripped by a workpiece loader and unloader assembly at a conveyor station. The loader and unloader assembly moves the workpiece along the axis of a spindle assembly through an opening in a shield which minimizes the accumulation of material cut from a workpiece on the loader and unloader assembly and on a conveyor assembly. The loader and unloader assembly moves a finished workpiece from the spindle assembly, rotates a support arm through a distance which is less than 90° to the condition of an unfinished workpiece in alignment with the spindle assembly and inserts the unfinished workpiece into the spindle assembly. The workpiece loader and unloader assembly then comes back through the opening in the shield and transfers the finished workpiece to an outfeed section of the conveyor assembly.

24 Claims, 5 Drawing Sheets

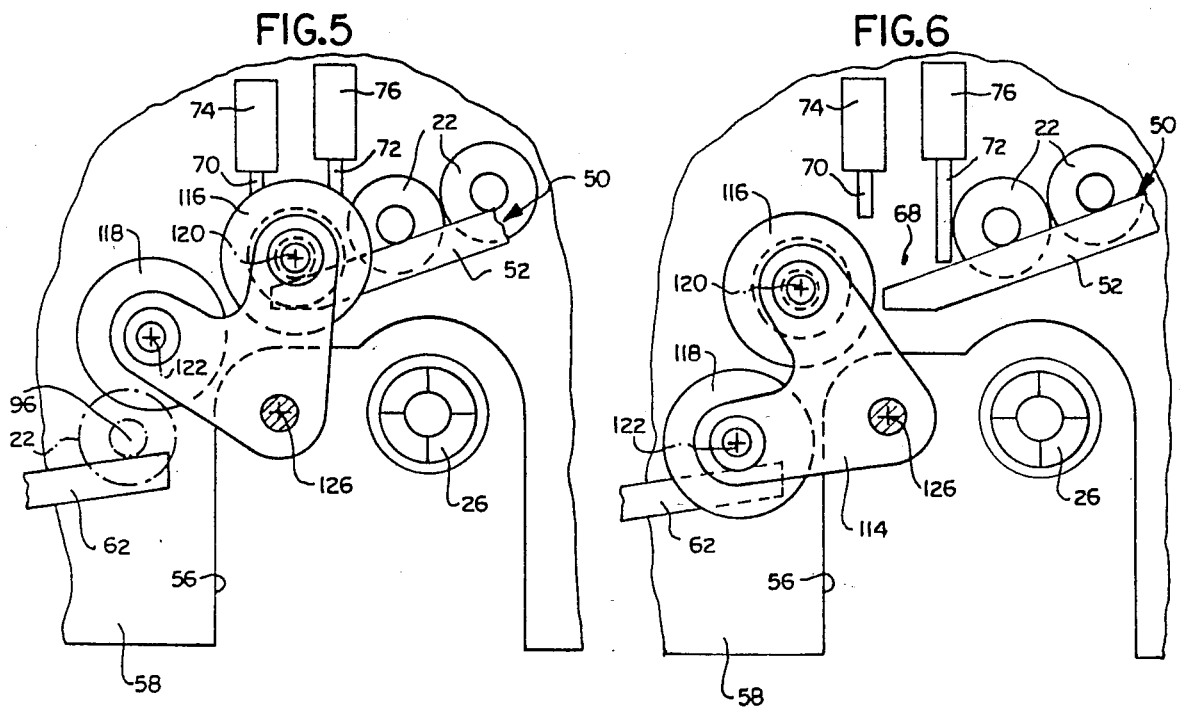
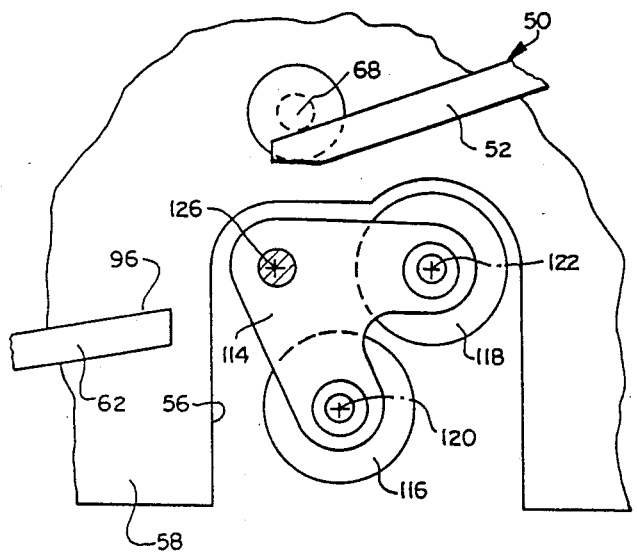
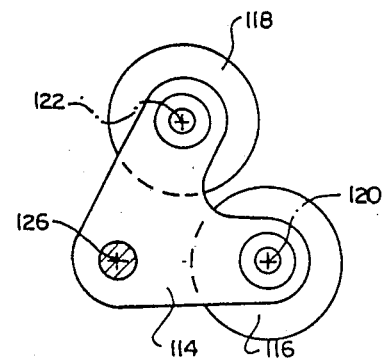
FIG.5  FIG.6  FIG.7  FIG.8

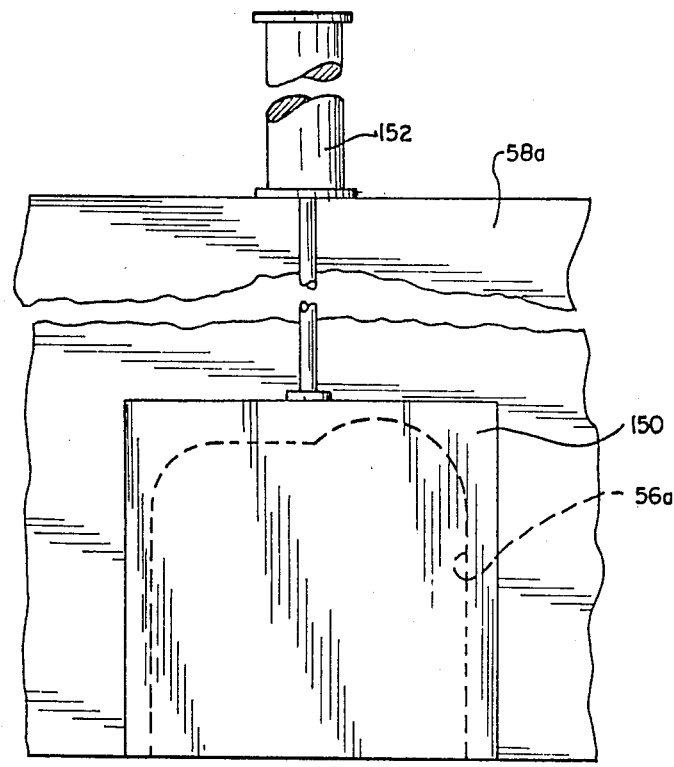
FIG. 9
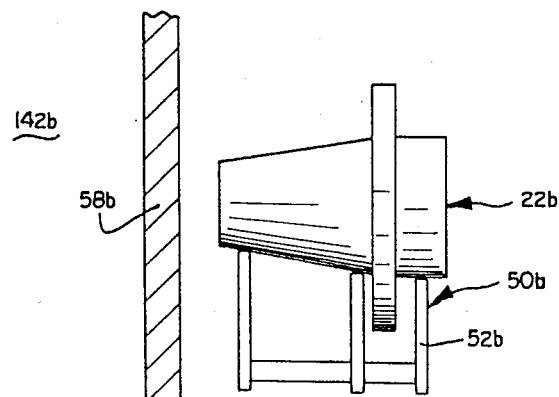
FIG. 10
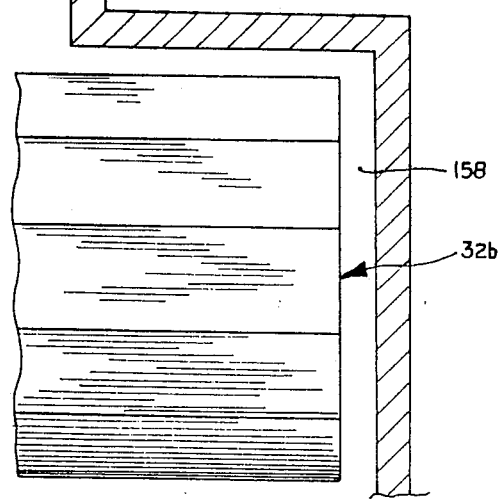

APPARATUS FOR MACHINING WORKPIECES AND METHOD THEREFOR

The present invention relates to a machine tool having a loader and unloader assembly which removes finished workpieces from a spindle assembly and inserts unfinished workpieces into the spindle assembly.

An assembly for loading and unloading workpieces includes a pair of arms which are rotated through 120° increments to enable the workpieces to be sequentially loaded into and unloaded from a spindle. The loader and unloader assembly is disposed along side of the spindle and requires a substantial amount of space. One example of a machine tool having an assembly for loading and unloading workpieces is disclosed in U.S. Pat. No. 4,161,849 issued July 24, 1979 and entitled Auxiliary Workpiece-Loading and-Unloading Apparatus.

Another assembly for transporting finished articles to a machine tool and finished articles from a machine tool includes a pair of arms which are moved through 180° increments to load workpieces into and to remove workpieces from a spindle. The loader and unloader assembly is relatively bulky and is mounted to one side of the spindle. An example of this type of loader and unloader assembly is described in U.S. Pat. No. 4,316,398 issued Feb. 23, 1982 and entitled Loading and/or Unloading Device for Machine Tools, Particularly Automatic Lathes.

DISCLOSURE OF THE INVENTION

The present invention provides a new and improved method and apparatus for sequentially machining a plurality of workpieces. The apparatus includes a machine tool having a spindle with an axis which extends through to a work area. Disposed adjacent to one end of the spindle is a work station at which a tool engages a workpiece. An inner index station, at which a workpiece loader and unloader assembly is indexed, is disposed outwardly of the work station.

A conveyor assembly is provided to transport unfinished workpieces to a conveyor station and to transport finished workpieces from the conveyor station. A shield between the conveyor assembly and the inner index station blocks cuttings removed from a workpiece at the work station. Finally, an outer index station is provided outwardly of the conveyor station.

A workpiece loader and unloader assembly is movable along a path which extends parallel to the spindle axis. The workpiece loader and unloader assembly has a pair of grippers which are disposed on a rotatable support and are spaced apart by an arcuate distance of less than 90°. An opening is provided in the shield to enable the support and grippers to be moved back and forth between various stations.

During operation of the apparatus, one of the grippers engages an unfinished workpiece at an infeed section of the conveyor assembly. The grippers and unfinished workpiece are moved through an opening in the shield and the free gripper, that is, the gripper which is not holding the unfinished workpiece, is utilized to remove a finished workpiece from the spindle. After the grippers have been rotated at the inner index station to align the unfinished workpiece with the spindle, the unfinished workpiece is inserted into the spindle. The grippers and finished workpiece are then moved back through the opening in the shield and the finished workpiece is transferred to an outfeed section of the conveyor assembly. During machining of the unfinished workpiece, the shield protects the workpiece loader and unloader assembly from chips formed at the work station.

Accordingly, it is an advantage of the invention to provide a new and improved apparatus and method for sequentially machining a plurality of workpieces and wherein a compact loader and unloader assembly moves unfinished workpieces from an infeed section of a conveyor assembly to a spindle and transports finished workpieces from the spindle to an outfeed section of the conveyor assembly along a path which extends through an opening in a shield. The shield protects the loader and unloader assembly from chips or cutting formed during a machining operation to make the loader and unloader assembly relatively trouble free in operation.

DETAILED DESCRIPTION OF THE INVENTION

Figure 4:
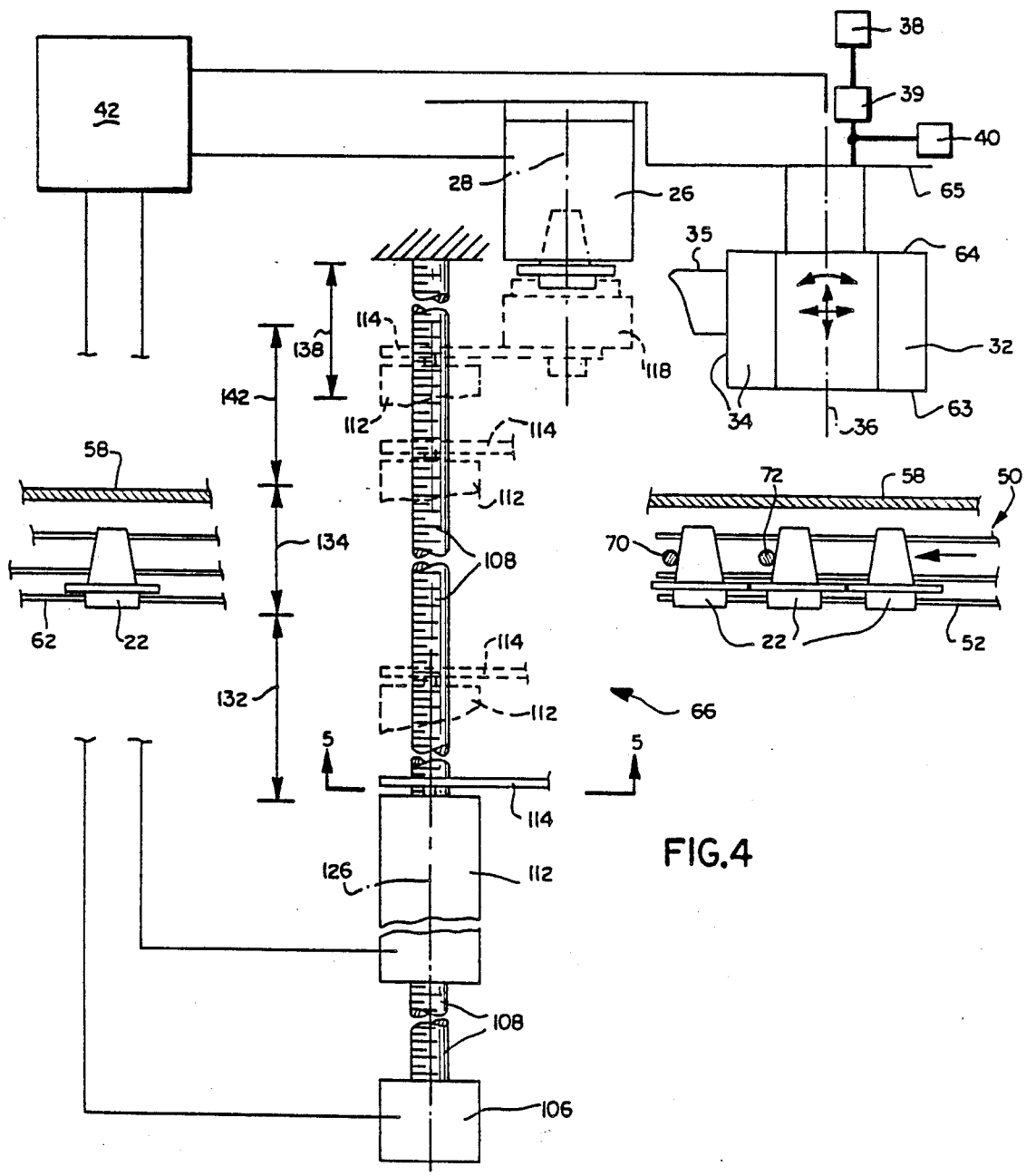

FIG. 4 a schematic plan view illustrating stations to which the loader and unloader assembly are moved along the axis of a spindle assembly;

FIG. 5 is a schematic illustration taken generally along the line 5—5 of FIG. 4, illustrating the loader and unloader assembly in a pickup orientation in which a first gripper is aligned with an unfinished workpiece supported by the conveyor assembly;

FIG. 6 is a schematic illustration, generally similar to FIG. 5, illustrating the loader and unloader assembly in a drop off orientation in which a finished workpiece is transferred from a second gripper to the conveyor assembly;

FIG. 7 is a schematic illustration, generally similar to FIGS. 5 and 6, illustrating the loader and unloader assembly in an unloading orientation in which it is aligned with an opening in a shield;

FIG. 8 is a schematic illustration, generally similar to FIGS. 5–7, illustrating the loader and unloader assembly in a loading orientation in which an unfinished workpiece is inserted into the spindle;

FIG. 9 is a fragmentary elevational view of a of an embodiment of the apparatus in which an opening in the shield is blocked by a door; and FIG. 10 is a fragmentary sectional view of another embodiment of the invention in which the shield is recessed to enable the turret to move beneath the conveyor assembly.

Figure 1:
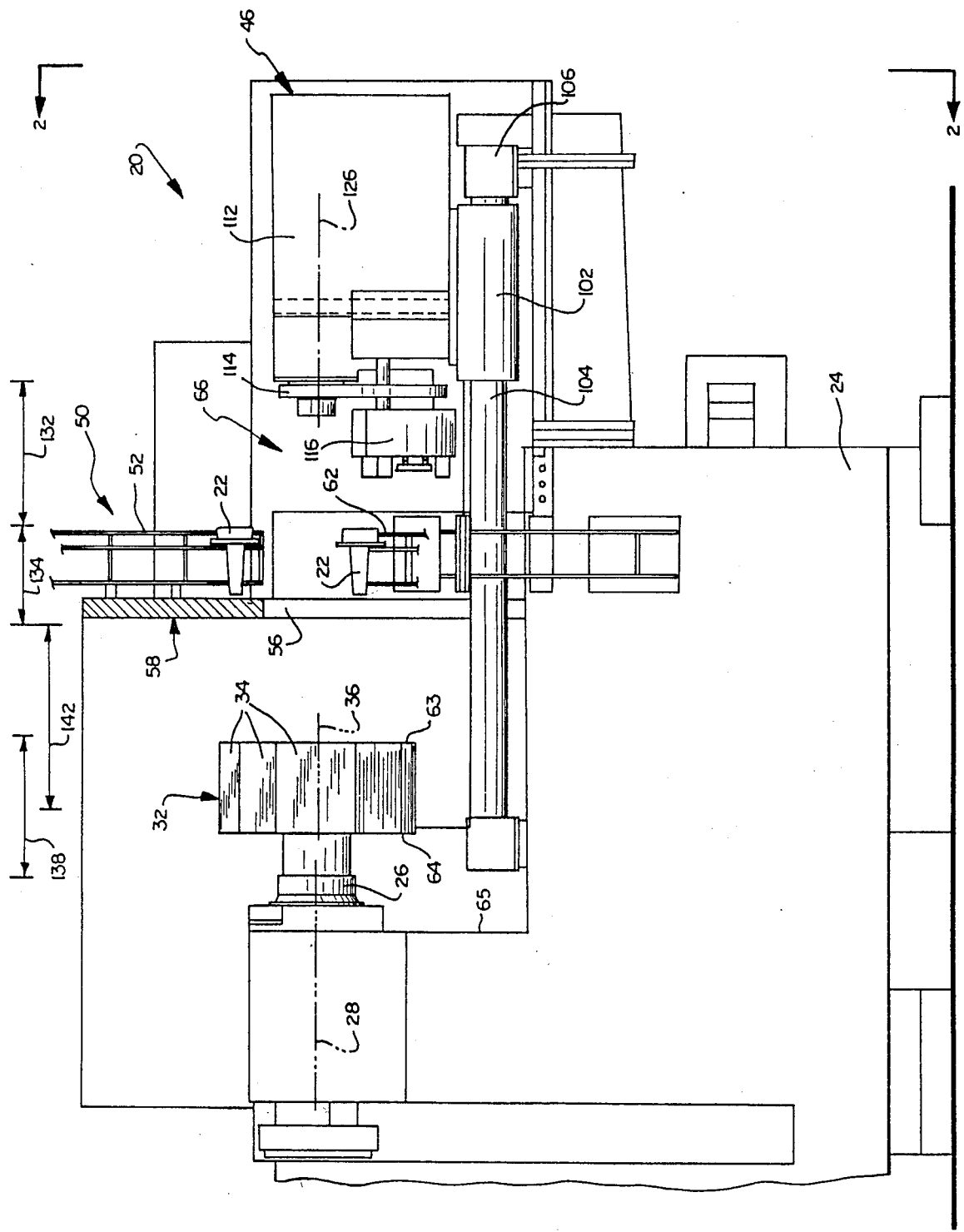
FIG. 1 is a side elevational view of a machine tool having a loader and unloader assembly constructed and operated in accordance with the present invention.

An apparatus 20 for sequentially machining a plurality of workpieces 22 is illustrated in FIG. 1. The apparatus 20 is a machine tool having a base or frame 24 upon which a spindle assembly 26 is mounted. The spindle assembly 26 is operable to grip a workpiece 22 and rotate the workpiece about horizontal spindle axis 28. A polygonal turret 32 has mounting surfaces 34 upon which cutting tools 35 (FIG. 4) may be mounted.

The turret 34 is rotatable about its horizontal central axis 36 by a turret drive assembly 38 (FIG. 4). In addition, a second drive assembly 39 is operable to move the turret axially along a path extending parallel to the spindle axis 28. The turret 32 is also movable horizontally toward and away from the spindle axis 28 by a third drive assembly 40 (FIG. 4). Although the horizontal distance between the turret axis 36 and spindle axis 28 will vary during sidewise movement of the turret 32 by the drive assembly 40, the turret axis is always parallel to the spindle axis.

Figure 2:
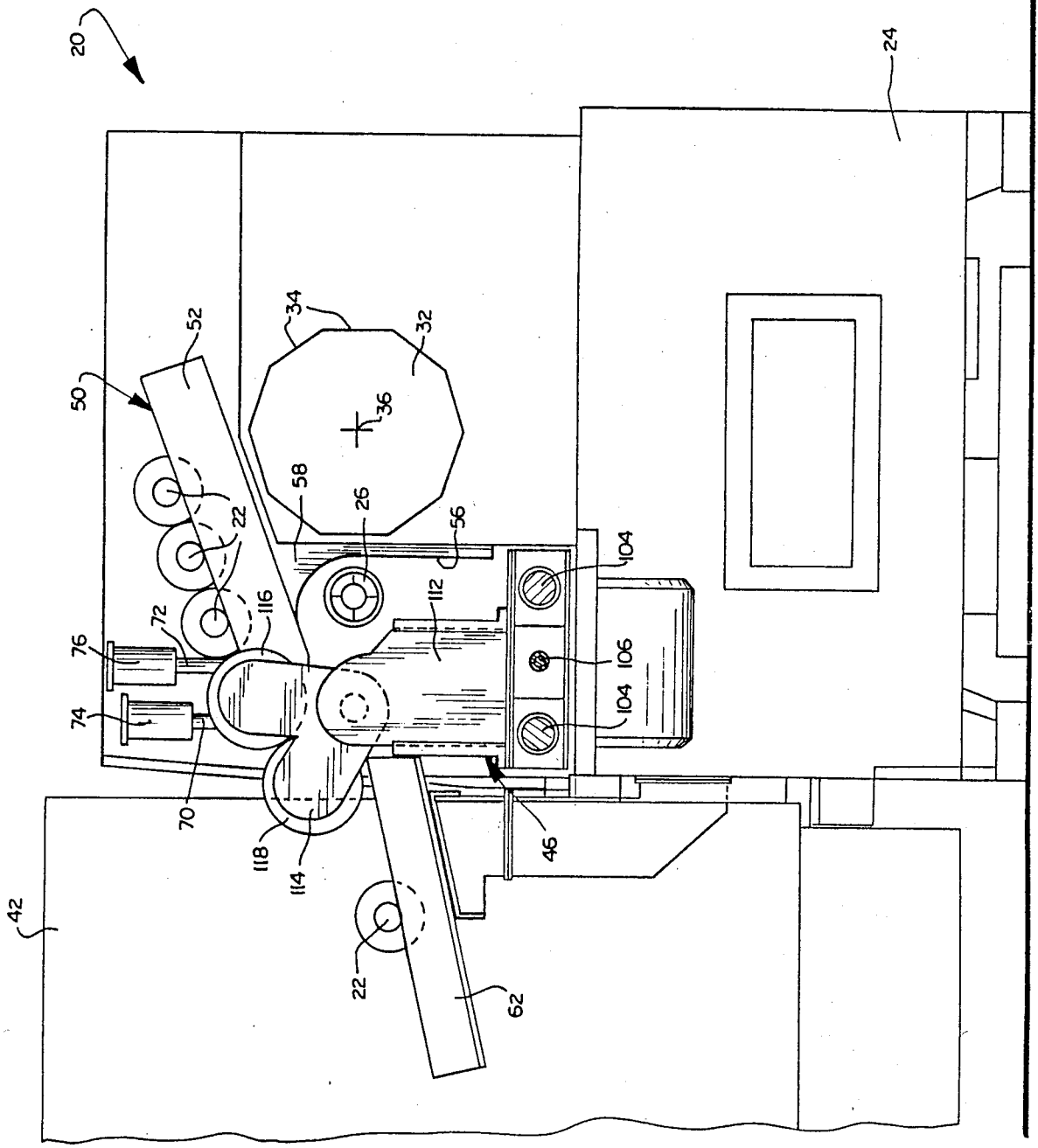
FIG. 2 is an end view, taken generally along the line 2—2 of FIG. 1, illustrating the relationship between a turret, the loader and unloader assembly, and a workpiece conveyor assembly.

The manner in which the turret 32 is moved relative to the spindle assembly 26 by the drive assemblies 38, 39 and 40 is the same as is disclosed in U.S. Pat. No. Re. 29,612. In one specific preferred embodiment of the invention, the machine tool 20 was a WSC-8 Turning Machine which is commercially available from The Warner & Swasey Company of 11000 Cedar Avenue, Cleveland, Ohio 44106. This specific machine tool has a General Electric 2000T CNC controller 42 (FIG. 2) which is programmable to control the operation of the apparatus 20.

A workpiece loader and unloader assembly 46 is constructed and operated in accordance with the present invention to transfer unfinished workpieces 22 from a conveyor assembly 50 to the spindle assembly 26 and to transfer finished workpieces from the spindle assembly 26 back to the conveyor assembly. Thus, the loader and unloader assembly 46 is operable to engage an unfinished workpiece 22 on an infeed section 52 of the conveyor assembly 50. The loader and unloader assembly 46 transports the unfinished workpiece through an opening 56 in a shield 58 disposed between the conveyor assembly 50 and the spindle assembly 26. The workpiece loader and unloader assembly 46 is operable to remove a finished workpiece 22 from the spindle assembly 26 and to insert an unfinished workpiece into the spindle assembly. The workpiece loader and unloader assembly 46 then transfers the finished workpiece 22 to an outfeed section 62 of the conveyor assembly 50.

Since the loader and unloader assembly 46 is movable back and forth in a work area which extends axially outwardly from the spindle assembly 26, relatively little space is required for the loader and unloader assembly 46. The infeed and outfeed sections 52 and 62 of the conveyor assembly 50 extend perpendicular to the spindle axis 28 and are constructed to allow the workpieces 22 to move under the influence of gravity to further minimize space requirements. The shield 58 protects the loader and unloader assembly 46 and conveyor assembly 50 against a detrimental build up of cuttings during operation of the machine tool 20.

When the turret 32 is in a fully extended position, an outer end face 63 (FIG. 1) of the turret is adjacent to the shield 58. An inner end face 64 of the turret is adjacent to a surface 65 on the base or frame 24 (FIG. 1) of the machine tool 20 when the turret 32 is fully retracted.

The conveyor assembly 50 is of the gravity feed type and includes the infeed section 52 (FIG. 2) and the outfeed section 62 along which workpieces 22 move under the influence of gravity. Thus, the unfinished workpieces 22 roll down the infeed section 52 to a pick up location 68 (FIG. 6). A first staging pin 70 (FIGS. 2 and 5) engages a workpiece 22 at the pickup location 68 to stop the workpiece from further movement along the infeed section 52. A second staging pin 72 stops movement of a next succeeding workpiece along the infeed section 52 of the conveyor assembly 50. The staging pins 70 and 72 are moved between extended positions (shown in FIGS. 2 and 5) and retracted positions by motors or actuators 74 and 76. Operation of the motors 74 and 76 is regulated by the controller 42.

Figure 3:
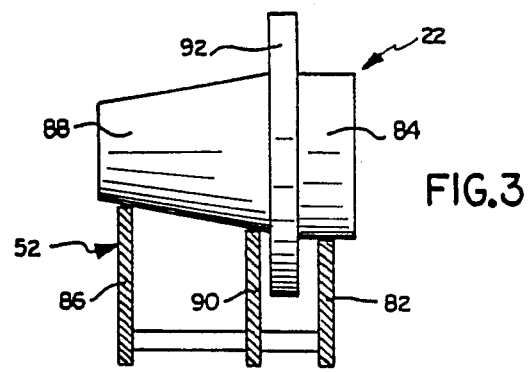
FIG. 3 is an enlarged sectional view illustrating the manner in which one specific workpiece is supported by the conveyor assembly.

The infeed conveyor section 52 includes an outer support strip or panel 82 (FIG. 3) which engages a cylindrical head end portion 84 of the workpiece 22. An inner panel or strip 86 extends parallel to the outer panel 82 and engages a conical shank portion 88 of the workpiece. An intermediate panel or strip 90 extends parallel to the panels or strips 82 and 86 and cooperates with the panel 82 to trap a circular rim 92 of the workpiece and hold the workpiece against axial movement relative to the conveyor section 52. The outfeed conveyor section 62 has the same construction as the infeed section 52. Although in the present instance the conveyor assembly 50 is designed to receive a workpiece which is a spindle for the wheel of a vehicle, it is contemplated that other conveyor constructions and workpieces could be used if desired.

The infeed and outfeed sections 52 and 62 of the conveyor assembly 50 extend perpendicular to the spindle axis 28 and are constructed to enable the workpieces 22 to move along the sections under the influence of gravity. Since the infeed and outfeed sections 52 and 62 extend perpendicular to the spindle axis 28, a minimum of space along the spindle axis is required for the conveyor assembly 50. In addition, since the conveyor assembly 50 is constructed to allow the workpieces 22 to move under the influence of gravity, the necessity of having a driven workpiece transfer mechanism is eliminated. Thus, the workpieces 22 roll down the infeed section 52 of the conveyor assembly 50 to the pickup location 68 which is directly above the path along which the loader and unloader assembly 46 moves parallel to the spindle axis 28. The outfeed section 62 of the conveyor assembly 50 slopes downwardly from a drop off location 96 (FIG. 5) which is disposed at a lower level and is spaced from the pickup location 68 (FIG. 6).

The loader assembly 46 includes a carriage 102 (FIG. 1) which is movable along ways 104 extending parallel to the spindle axis 28. A motor 106 is operable to rotate a drive screw 108 (FIG. 4) which is disposed between and extends parallel to the ways 104. An encoder is connected with the motor 106 and drive screw 108 to provide an output to the controller 42 indicative of the position of the carriage 102 along the ways 104.

The loader and unloader assembly includes a drive assembly 112 which is mounted on the carriage 102. The drive assembly 112 is operable to rotate a support member 114 about an axis 126 (FIG. 4) which is parallel to and offset to one side of the spindle axis connected with the support arm 114 through a gear train and an encoder which provides an output to the controller 42 indicative of the position of the support arm 114 relative to the carriage 102.

The support member 114 has a generally V-shaped configuration (FIG. 5). A pair of grippers 116 and 118 are mounted on outer end portions of the arms of the support member 114. The grippers 116 and 118 are of a known construction and are operated between open and closed conditions by the controller 42. The grippers 116 and 118 have central axes 120 and 122 which are spaced apart by an accurate distance of 65° (FIG. 7) about the axis 126 around which the support arm 114 is rotated by the drive assembly 112. The central axes 120 and 122 of the grippers 116 and 118 extend parallel to the support axis 126 and spindle axis 28.

During operation of the motor 106 to rotate the drive screw 108 to move the carriage 102 along the ways 104, the support member 114 and grippers 116 and 118 are moved between an outer index station 132 (FIGS. 1 and 4) and a conveyor station 134 at which the conveyor assembly 50 is located. When the support arm 114 and grippers 116 and 118 are at the outer index station 132, the drive assembly 112 can be operated to rotate the support arm and grippers in either a clockwise or counterclockwise direction without interference between a workpiece held by the grippers and the conveyor assembly 50.

When the carriage 102 has been moved inwardly from the index station 132 to the conveyor station 134, the drive assembly 112 can be operated to pivot the support arm 114 between a pickup orientation (FIG. 5) and a drop off orientation (FIG. 6). When the support arm 114 is in the pickup orientation of FIG. 5, the gripper 116 is axially aligned with an unfinished part 22 disposed at the pickup location 68. Therefore, upon movement of the loader assembly 46 from the outer index station 132 to the conveyor station 134 with the support member 114 in the pickup orientation of FIG. 5, the open gripper 116 engages a workpiece 22 at the pickup location 68. It should be noted that at this time the gripper 118 is spaced from the outfeed section 62 of the conveyor 50. Upon counterclockwise rotation of the support arm 114 through 40° from the pickup orientation of FIG. 5 to the drop off orientation of FIG. 6, a finished workpiece 22 held by the gripper 118 can be transferred to the outfeed section 62 of the conveyor 50 at the drop off location 96.

When the support 114 and grippers 116 and 118 are at the outer index station 132, the support arm can be rotated to the unloading orientation of FIG. 7. When the support arm 114 is in the unloading orientation of FIG. 7, the support arm and grippers 116 and 118 are aligned with the opening 56 in the shield 58. At this time, the central axis 122 of the gripper 118 is aligned with the spindle axis 28.

Upon operation of the motor 106 to rotate the drive screw 108 with the support arm 114 and grippers 116 and 118 in the unloading orientation of FIG. 7, the grippers and support arm are moved through the opening 56 in the shield 58 to a work station 138 disposed immediately adjacent to the outer end of the spindle assembly 26 (see FIGS. 1 and 4). As the open gripper 118 approaches the work station 138, the gripper engages a finished workpiece 22 held by the spindle assembly 26.

After closing of the gripper 118 and opening of a chuck in the spindle assembly 26 by the controller 42, the support arm 114 and grippers 116 and 118 are moved outward to the inner index station 142 by operation of the motor 106 and reverse rotation of the drive screw 108. When the support arm 114 and grippers 116 and 118 are back at the inner index station 142, the drive assembly 112 is quickly operated to rotate the grippers 116 and 118 to the loading orientation of FIG. 8 in which the unfinished workpiece 22 in the gripper 116 is aligned with the open chuck into the spindle assembly 26. The motor 106 is then operated to move the gripper 116 back to the work station 138 to insert the unfinished workpiece into the spindle assembly 26.

Operation

At the end of one machining operation to finish a workpiece 22, the loader and unloader assembly 46 is moved inwardly to remove the finished workpiece from the spindle assembly 26. In preparation for a next succeeding machining operation, the loader and unloader assembly 46 moves to the outer index station 132 (FIG. 1) with the finished workpiece 22 held by the gripper 118. At this time, the gripper 116 is empty and open. The drive assembly 112 is then operated by the controller 42 to rotate the support 114 to the pickup orientation of FIG. 5. This moves the central axis 120 of the open gripper 116 into a coaxial relationship with an unfinished workpiece 22 at the pickup location 68.

The motor 106 is then operated by the controller 42 to move the support 114 and grippers 116 and 118 from the outer index station 132 to the conveyor station 134. As the open gripper 116 moves into the conveyor station 134, the gripper 116 engages a workpiece 22 supported on the infeed section 52 of the conveyor assembly 50 at the pickup location 68. The controller 42 then closes the gripper 116 to firmly grip the unfinished workpiece 22. The controller 42 then operates the motor 74 to retract the staging pin 70. This releases the unfinished workpiece 22 for movement away from the infeed section 52 of the conveyor assembly 50.

Once the unfinished workpiece 22 has been firmly gripped and the staging pin 70 retracted, the drive assembly 112 is operated by the controller 42 to rotate the support 114 in a counterclockwise direction through 40° from the pickup orientation of FIG. 5 to the drop off orientation of FIG. 6. As this occurs, a previously finished workpiece held by the gripper 118 is moved into engagement with the outfeed section 62 of the conveyor assembly 50. The controller 42 then operates the gripper assembly 118 to an open condition to release the finished workpiece 22 at the drop off location 96 on the outfeed section 62 of the conveyor assembly 50.

Next, the motor 106 is operated to move the carriage 102 (FIG. 1) outwardly to the outer index station 132. This moves the gripper 118 out of engagement with the finished workpiece 22 at the conveyor outfeed section 62. The finished workpiece 22 then rolls down the outfeed section 62 of the conveyor assembly 50 away from the work area 66.

After the grippers 116 and 118 have been moved back to the outer index station 132, the controller 42 effects operation of the motor 74 to again extend the staging pin 70. Thereafter, the controller effects operation of the motor 76 to retract the staging pin 72. This allows a next succeeding unfinished workpiece 22 to roll down the infeed conveyor section 52 to the pickup location 68. The controller 42 then operates the motor 76 to again extend the staging pin 72.

At the outer index station 132, the support 114 and grippers 116 and 118 are rotated in a counterclockwise direction from the drop off orientation of FIG. 6 through 170° to the unloading orientation of FIG. 7. This moves the central axis 122 of the open gripper 118 into alignment with the central axis 28 of the spindle assembly 26. The gripper 116 is maintained closed holding an unfinished workpiece 22.

The support 114 remains at the outer index station 132 until the machining of a workpiece 22 held by the spindle assembly 26 is almost completed. At this time, the support 114 may move inward to an intermediate position in which the support is disposed just slightly inwardly of the shield 58 to reduce the distance which to the support has to move to the work station 138. However, it is contemplated that it may be preferred to maintain the support 114 at the outer index station 132 so that the workpiece loader and unloader assembly 46 is spaced from cuttings or chips being formed at the work station 138 by tools on the turret 32 engaging a workpiece 22 as it is rotated by the spindle assembly 26.

When the support 114 is at the outer index station 132 in the unloading orientation of FIG. 7, the grippers 116 and 118 and support 114 are aligned with the opening 56 in the shield 58. If desired, the grippers 116 and 118 and the other components of the loader and unloader assembly 46 may be further protected from chips by maintaining the support 114 and grippers 116 and 118 in the pickup orientation of FIG. 5 until immediately before completion of the machining operation on the workpiece 22. During the final stages of the machining operation, the support 114 may be moved from the pickup orientation of FIG. 5 to the unloading orientation of FIG. 7.

Regardless of the orientation of the support 114 and its location along the spindle axis 28 immediately before the completion of a machining operation, when the machining of a workpiece 22 has been completed and the turret 32 has moved sideways away from the work area 138, the motor 106 is operated to move the support 114 and grippers 116 and 118 into the work station 138 with the support 114 in the unloading orientation of FIG. 7. As this occurs, the open gripper 118 engages the finished workpiece. The controller 42 then effects operation of the gripper 118 to a closed condition to firmly hold the finished workpiece. The chuck in the spindle assembly 26 is then opened by the controller 42 to release the finished workpiece.

Once the finished workpiece has been released by the spindle assembly 26, the motor 106 is operated to move the support 114 and grippers 116 and 118 outwardly from the work station 138 to the inner index station 142. When the support 114 has been moved to the inner index station 142, the finished workpiece held by the gripper 118 and the unfinished workpiece held by the gripper 116 are clear of the spindle assembly 26. The drive assembly 112 is then operated to rotate the support 114 through 65° in a counterclockwise direction from the loading orientation of FIG. 7 to the unloading orientation of FIG. 8. Since the support 114 moves through a relatively short accurate distance, that is, an accurate distance which is less than 90°, the support can be quickly moved from the unloading orientation of FIG. 7 to the loading orientation of FIG. 8. Since a workpiece cannot be machined during this time, it is important to minimize the distance through which the support 114 is moved from the unloading orientation to the loading orientation.

When the support 114 is in the loading orientation of FIG. 8, the central axis 120 of the gripper 116 is aligned with the central axis 28 of the spindle assembly 26. The motor 106 is then operated to move the support 114 inwardly from the inner index station 142 to the work station 138. As this occurs, the unfinished workpiece held by the gripper 116 is inserted into the open chuck of the spindle assembly 26. The controller 42 then effects operation of the spindle chuck to a closed condition to firmly grip the unfinished workpiece. The controller 42 then operates the gripper 116 to an open condition.

As soon as the gripper 116 has opened, the motor 106 is operated to move the support 114 and grippers 116 and 118 outwardly to the inner index station 142 with the support 114 in the loading orientation of FIG. 8. Once the support 114 and grippers 116 and 118 have moved outwardly for a distance sufficient to enable the finished workpiece 22 in the gripper 118 to clear the unfinished workpiece in the spindle assembly 26, the support 114 is rotated through 65° in a clockwise direction from the loading orientation of FIG. 8 back to the unloading orientation of FIG. 7. As the support 114 and grippers 116 and 118 move to the unloading orientation of FIG. 7, they move back into alignment with the opening 56 in the shield 58.

The support 114 and grippers 116 and 118 are then moved back to the outer index station 132. As the support 114 and grippers 116 and 118 move away from the spindle assembly 26, the controller 42 operates the turret drive assembly 40 to move the turret 32 toward the spindle axis 28. Simultaneously therewith, the controller 42 effects operation of the spindle assembly 26 to rotate the workpiece 22 about the spindle axis 28 so that machining of the workpiece can be started with a minimum of lost time.

As the machining of the workpiece is being started, the support 114 and grippers 116 and 118 are moved toward the outer index station 132 with the support in the unloading orientation of FIG. 7. Since cuttings which tend to accumulate on and interfere with the operation of the grippers 116 and 118 are being formed during the machining operation, it is contemplated that the drive assembly 112 will be operated to rotate the support 114 and grippers 116 and 118 from the unloading orientation of FIG. 7 in a counterclockwise direction through 150° to the pickup orientation of FIG. 5. When the support 114 and grippers 116 and 118 are in the pickup orientation of FIG. 5, the shield 58 is disposed between the grippers and the work station 138 where cuttings are being generated during high speed rotation of the workpiece by the spindle assembly 26. Of course, this results in the grippers 116 and 118 and support 114 being positioned for a next succeeding cycle of operation.

Alternative Embodiments

In the embodiment of the invention illustrated in FIGS. 1-8, the shield 58 has an opening 56 through which some cuttings or chips may pass. With many metals, the volume and type of cuttings are such that the amount which will pass through the opening 56 would not be objectionable. However, it is contemplated that with certain metals it may be desirable to close the opening 56 during a machining operation.

In the embodiment of the invention illustrated in FIG. 9, the opening in the shield is closed during a machining operation. Since the embodiment of the invention shown in FIG. 9 is generally similar to the embodiment of the invention shown in FIGS. 1-8, similar numerals will be utilized to designate similar components, the suffix letter "a" being added to the numerals of FIG. 9 to avoid confusion.

The shield 58a has an opening 56a through which the support 114 and grippers 116 and 118 of the loader and unloader assembly 46 of FIGS. 1-8 may move. In accordance with a feature of the embodiment of the invention shown in FIG. 9, a door or slide panel 150 is provided to block the opening 56a during a machining operation.

Upon or immediately before completion of a machining operation, a pneumatic motor 152 is operated by the controller 42 to raise the door 150 and unblock the opening 56a. With the door 150 raised, the various components of the workpiece loader and unloader assembly can move through the shield 58a.

It is contemplated that it may be desirable, for the machining of certain workpieces, to mount tools on the inner end portion of the turret 32. During the machining of these workpieces, it may be desirable to move the turret 34 outwardly through a relatively large operating stroke. In the embodiment of the invention shown in FIG. 10 the shield is recessed to accommodate a relatively long stroke of the turret. Since the embodiment of the invention illustrated in FIG. 10 is generally similar to the embodiment of the invention illustrated in FIGS. 1-8, similar numerals will be utilized to designate similar components, the suffix letter "b" being added to the numerals of FIG. 10 to avoid confusion.

The shield 58b is disposed between the conveyor assembly 50b and the inner index station 142b. In accordance with a feature of this embodiment of the invention, the shield 58b has a recess 158 into which the turret 32b can move. Thus, the turret 32b can be moved through a relatively long operating stroke so that the outer end portion of the turret is disposed in the recess 158 beneath the conveyor assembly 50b. Of course, the shield 58b is provided with an opening, similar to the opening 56 of FIGS. 1-8.

Conclusion

In view of the foregoing description it is apparent that the present invention provides a new and improved method and apparatus 20 for sequentially machining a plurality of workpieces 22. The apparatus includes a machine tool having a spindle assembly 26 with an axis 28 which extends through a work area 66. Proceeding outwardly from the spindle assembly 26, a work station 138 at which a tool engages a workpiece 22 is disposed adjacent to one end of the spindle assembly. An inner index station 142, at which a workpiece loader and unloader assembly 46 is indexed, is disposed outwardly of the work station 138.

A conveyor assembly 50 is provided to transport unfinished workpieces 22 to a conveyor station 134 and to transport finished workpieces from the conveyor station. A shield 58 between the conveyor assembly 50 and the inner index station 142 blocks cuttings removed from a workpiece at the work station 138. Finally, an outer index station 132 is provided outwardly of the conveyor station 134.

The workpiece loader and unloader assembly 46 is movable along a path which extends parallel to the spindle axis 28. The workpiece loader and unloader assembly 46 has a pair of grippers 116 and 118 which are disposed on a rotatable support 114 and are spaced apart by an accurate distance of less than 90°. An opening 56 is provided in the shield 58 to enable the support 114 and grippers 116 and 118 to be moved back and forth between various stations 132, 134, 138 and 142.

During operation of the apparatus 20, the gripper 116 engages an unfinished workpiece 27 at an infeed section 52 of the conveyor assembly 50. The grippers 116 and 118 and unfinished workpiece 22 are moved through an opening 56 in the shield 58 and the gripper 118 is utilized to remove a finished workpiece 22 from the spindle assembly 26. After the grippers 116 and 118 have been rotated at the inner index station 142 to the loading orientation of FIG. 8, the unfinished workpiece 22 is inserted into the spindle assembly 26. The grippers 116 and 118 and finished workpiece 22 are then moved back through the opening 56 in the shield 58 and the finished workpiece is transferred to the outfeed section 62 of the conveyor assembly 50. During machining of the unfinished workpiece 22, the shield 58 protects the workpiece loader and unloader assembly 46 from chips formed at the work station 138.

I claim:

1. An apparatus for sequentially machining a plurality of workpieces (22), said apparatus comprising a base (24) which at least partially defines a work area (66), spindle means (26) connected with said base and disposed at one end of said work area for sequentially gripping workpieces (22) and rotating a gripped workpiece about a spindle axis (28) which extends outwardly from one end of said spindle means through the work area, a plurality of stations (132, 134, 138, 142) located in the work area in a linear array which extends outwardly from the one end of said spindle means along the spindle axis, said plurality of stations including a work station (138) located adjacent to the one end of said spindle means and a conveyor station (134) disposed along the spindle axis outwardly of said work station, conveyor means (50) for conveying unfinished workpieces to said conveyor station (134) in a direction toward the spindle axis (28) and for conveying finished workpieces from said conveyor station in a direction away from the spindle axis, said conveyor means (50) including an infeed section (52) which extends into said conveyor station (134) along a path which is transverse to the spindle axis to a pickup location and an outfeed section (62) which extends from a drop off location at said conveyor station along a path extending transverse to the spindle axis, said apparatus being characterized by shield means (58) located outwardly from said one end of said spindle means along the spindle axis between said infeed and outfeed sections (52,62) of said conveyor means (50) and said work station (138) for blocking materials moving away from a workpiece while the workpiece is being rotated by said spindle means, said shield means (58) including means for at least partially defining an opening (56), and workpiece loading and unloading means (46) for engaging an unfinished workpiece which is disposed on said infeed section (52) of said conveyor means (50) at the pickup location (68), for moving the unfinished workpiece along the spindle axis through the opening (56) in said shield means (58) in a direction toward said one end of said spindle means (26), for engaging a finished workpiece gripped by said spindle means, for moving the finished workpiece along the spindle axis through the opening in said shield means in a direction away from said one end of said spindle means (26) to the outfeed section (62) of said conveyor means and for releasing the finished workpiece at the drop off location (98) which is spaced from the pickup location (68).

2. An apparatus as set forth in claim 1 wherein said workpiece loading and unloading means (46) includes a support (114) rotatable about a second axis (126) which is parallel to and offset from the spindle axis (26) and first and second gripper means (116, 118) mounted at spaced apart locations on said support for gripping workpieces, said first and second griper means having central axes (120, 122) which extend parallel to the second axis and are offset relative to each other about the second axis by an accurate distance of less than 90°.

3. An apparatus as set forth in claim 1 wherein said workpiece loading and unloading means includes a support (114) rotatable about a second axis (126) which is parallel to and offset from the spindle axis and first and second gripper means (116, 118) mounted at spaced apart locations on said support for gripping workpieces, said apparatus further including drive means (106, 108, 112) for moving said support (114) along a linear path extending between said plurality of stations and for rotating said support about the second axis, and control means (42) for effecting operation of said drive means to move said support (114) through the opening (56) in said shield means, for effecting operation of said drive means to rotate said support to a pickup orientation (FIG. 5), for effecting operation of said drive means t move said first gripper means (116) into engagement with an unfinished workpiece at said infeed section (52) of said conveyor means at said conveyor station while said support (114) is in the pickup orientation and while said support is disposed on a first side of said shield means (58) opposite from said spindle means (26), for effecting operation of said drive means (106, 108, 112) to move said support (114) and an unfinished workpiece engaged by said first gripper means through the opening (56) in said shield means (58) from the first side of said shield means to a second side of said shield means, for effecting operation of said drive means to move said support (114) to the work station with the support in an unloading orientation (FIG. 7) to engage a finished workpiece gripped by said spindle means (26) with said second gripper means (118) while said support is disposed on the second side of said shield means (58), for effecting operation of said drive means to rotate said support (114) from the unloading orientation to a loading orientation (FIG. 8) in which said first gripper means (116) is aligned with the spindle axis (28), for effecting operation of said drive means to move said support (114) to insert an unfinished workpiece held by said first gripper means (116) into said spindle means (26), for effecting operation of said drive means to move said support (114) and finished workpiece engaged by said second gripper means from the second side of said shield means (58) to the first side of said shield means by moving said support back through the opening (56) in said shield means, and for effecting operation of said drive means rotate said support (114) to a drop off orientation (FIG. 6) in which said support is angularly offset from said pickup orientation to enable a finished workpiece to be transferred from said second gripper means to said outfeed section (62) of said conveyor means.

4. An apparatus as set forth in claim 1 further including rotatable turret means (32) for holding a plurality of cutting tools, said turret means being rotatable about an axis extending parallel to the spindle axis, said turret means having an outer end portion (63) which faces toward said shield means, and turret drive means (39)..for moving said turret means between a fully extended condition in which said outer end portion of said turret means is spaced a first distance from said shield means and a fully retracted position in which said outer end portion of said turret means is spaced a second distance from said shield means, said second distance being greater than said first distance, and drive means (40) for moving said turret means toward and away from the spindle axis.

5. An apparatus as set forth in claim 1 wherein said shield means (58) includes a member (150) which is separate from and is movable relative to said workpiece loading and unloading means (46) between a first position at least partially blocking the opening (56) in said shield means and a second position in which said member is ineffective to block the opening in said shield means, said shield means further including motor means (152) for moving said member (150) relative to said workpiece loading and unloading means between the first and second positions.

6. An apparatus as set forth in claim 1 wherein said workpiece loading and unloading means includes a support (114) rotatable about a second axis (126) which is parallel to and offset from the spindle axis and first and second gripper means (116, 118) mounted at spaced apart locations on said support for gripping workpieces, said first and second gripper means having central axes (120, 122) which extend parallel to the second axis, drive means (106, 108, 112) for moving said support (114) along a path extending through the opening (56) in said shield means (58) and between said plurality of stations and for rotating said support (114) about the second axis, and Control means (42) for effecting operation of said drive means to rotate said support (114) to a pickup orientation (FIG. 5) in which the central axis of said first gripper means (116) is aligned with an unfinished workpiece at the infeed section (52) of said conveyor means and is offset from the spindle axis, for effecting operation of said drive means to move said first gripper means (116) into engagement with the unfinished workpiece at said infeed section (52) of said conveyor means (50) while said support (114) is on a first side of said shield means (58) opposite from spindle means (26) and while said support is in the pickup orientation, for effecting operation of said drive means to rotate said support (114) to an unloading orientation (FIG. 7) in which the central axis of said second gripper means (118) is aligned with the spindle axis, for effecting operation of said drive means to move said support (114) and an unfinished workpiece engaged by said first gripper means (116) through the opening (56) in said shield means (58) from the first side of said shield means to a second side of said shield means with said support in the unloading orientation, for effecting operation of said drive means to move said support (114) to the work station on the second side of said shield means (58) with the support in the unloading orientation to engage a finished workpiece gripped by said spindle means (26) with said second gripper means (118), for effecting operation of said drive means to rotate said support (114) from the unloading orientation to a loading orientation (FIG. 8) in which the central axis of said first gripper means (116) is aligned with the spindle axis while said support (114) is on the second side of said shield means (58), for effecting operation of said drive means to insert an unfinished workpiece held by sad first gripper means (116) into said spindle means (26) while said support (114) is on the second side of said shield means, for effecting operation of said drive means to move said support (114) and finished workpiece engaged by said second gripper means (118) back through the opening (56) in said shield means (58) from the second side of said shield means to the first side of said shield means with said support in the unloading orientation, and for effecting operation of said drive means rotate said support (114) to a drop off orientation (FIG. 6) in which said support is angularly offset from said pickup orientation to enable a finished workpiece to be transferred from said second gripper means (118) to said outfeed section (62) of said conveyor means (50).

7. An apparatus as set forth in claim 1 further including turret means (32b) for holding a plurality of tools to machine each of the workpieces in turn, means for supporting said turret means for movement along a path extending parallel to the spindle axis between a retracted position adjacent to said spindle means and an extended position in which at least a portion of said turret means is disposed beneath one of said conveyor sections (50b; FIG. 10).

8. A method of sequentially loading unfinished workpieces into a spindle (26) having an axis (28) of rotation and unloading finished workpieces from the spindle with a workpiece loader and unloader (46) having a plurality of grippers (116, 118) mounted on a support, said method comprising the steps of conveying an unfinished workpiece to a conveyor station (134), gripping the unfinished workpiece with a first one of the grippers (116) at the conveyor station, rotating the support about a second axis (126) parallel to the spindle axis to move a second one of the grippers (118) into axial alignment with the spindle, gripping a finished workpiece held by the spindle with the second gripper while the first gripper grips the unfinished workpiece, disengaging the finished workpiece from the spindle, and gripping, the unfinished workpiece held by the first gripper with the spindle while the second gripper grips the finished workpiece, said method being characterized by the step of moving the support (114) and first and second grippers (116, 118) through an opening (56) in a shield (58) disposed between the spindle (26) and a conveyor (50) for the workpieces with the unfinished workpiece held by the first gripper (116) and with the second gripper (118) aligned with the spindle axis (28).

9. A method as set forth in claim 8 further including the step of rotating the support (114) about the second axis (126) to move the second gripper out of axial alignment with the spindle and to move the first gripper into axial alignment with the spindle after performing said step of disengaging the finished workpiece from the spindle and prior to performing said step of gripping the unfinished workpiece held by the first gripper with the spindle.

10. A method as set forth in claim 8 further including the step of moving the support and first and second grippers through the opening in the shield with the finished workpiece held by the second gripper.

11. A method as set forth in claim 8 further including the step of disengaging the finished workpiece from the second gripper at the conveyor station and conveying the finished workpiece from the conveyor station along a path extending perpendicular to the spindle axis.

12. A method as set forth in claim 8 further including the steps of blocking the opening in the shield during performance of said step of gripping the workpiece with a first one of the grippers and unblocking the opening in the shield prior to performance of said step of moving the support and first and second grippers through the opening in the shield.

13. An apparatus for sequentially machining a plurality of workpieces, said apparatus comprising a base (24) which at least partially defines a work area (66), spindle means (26) connected with said base and disposed at one end of said work area for sequentially gripping workpieces and rotating a gripped workpiece about a spindle axis (28) which extends from one end of said spindle means through the work area, a plurality of stations (132, 134, 138, 142) disposed in the work area at locations along the spindle axis, said plurality of stations including a work station (138) disposed adjacent to an outer end portion of said spindle means, an inner index station (142) disposed along the spindle axis outwardly of said work station, a conveyor station (134) disposed along the spindle axis outwardly of said inner index station, and an outer index station (132) disposed along the spindle axis outwardly of said conveyor station, rotatable turret means (32) for holding tools to machine a workpiece as the workpiece is rotated by said spindle means, said turret means being movable along a path which extends parallel to the spindle axis between a retracted position in which said turret means is disposed adjacent to said spindle means and an extended position in which said turret means is disposed adjacent to an outer portion of the work area, turret drive means (39, 40) for moving said turret means between the extended and retracted positions and for moving said turret means toward and away from the spindle axis, conveyor means (50) for conveying unfinished workpieces to said conveyor station and for conveying finished workpieces from said conveyor station, said conveyor means including an infeed section (52) which extends into said conveyor station along a path which is transverse to the spindle axis and an outfeed section (62) which extends out from said conveyor station along a path extending transverse to the spindle axis, said infeed conveyor section being spaced from said outfeed conveyor section, shield means (58) disposed between said infeed and outfeed sections of said conveyor means and said inner index station for blocking materials moving away from the work station while a workpiece is being rotated by said spindle means, said shield means including means for at least partially defining an opening (56) through which the spindle axis extends, workpiece loading and unloading means (46) for engaging an unfinished workpiece at said infeed section of said conveyor means, for moving the unfinished workpiece through the opening in said shield means to said spindle means, for engaging a finished workpiece gripped by said spindle means, and for moving the finished workpiece through the opening in said shield means to the outfeed section of said conveyor means, said workpiece loading and unloading means including a support (114) rotatable about a second axis (126) which is parallel to and offset from the spindle axis and first and second gripper means (116, 118) mounted at spaced apart locations on said support for gripping workpieces, said first and second gripper means having central axes (120, 122) which extend parallel to the second axis and are offset relative to each other about the second axis by an accurate distance of less than 90 degrees, second drive means (106, 108, 112) for moving said support along a path extending between said plurality of work stations and for rotating said support about the second axis, and control means (42) for effecting operation of said second drive means (106, 108, 112) to move said support (114) toward and away from said spindle means (26) and to rotate said support relative to said spindle means about said second axis (126) and for effecting operation of said turret drive means (38) to move said turret means relative to said spindle means, said control means including means for effecting operation of said second drive means (106, 108, 112) to move said support to said outer index station (132), for effecting operation of said drive means to rotate said support at said outer index station to a pickup orientation (FIG. 5), for effecting operation of said drive means to move said first gripper means (116) into engagement with an unfinished workpiece at said infeed section (52) of said conveyor means at said conveyor station (134) while said support is in the pickup orientation in which a central axis of said first gripper means is aligned with a workpiece on said infeed section of said conveyor means, for effecting operation of said drive means to move said support and an unfinished workpiece engaged by said first gripper means to said outer index station (132), for effecting operation of said drive means to rotate said support at the outer index station to an unloading orientation (FIG. 7) in which the central axis of said second gripper means (118) is aligned with the spindle axis (28), for effecting operation of said drive means to move said support and an unfinished workpiece engaged by said first gripper means (116) through the opening (56) in said shield means (58) to the work station (138) with the support in the unloading orientation to engage a finished workpiece gripped by said spindle means 26 with said second gripper means (118), for effecting operation of said drive means (106, 108, 112) o move said support (114) to the inner index station (142) and to rotate said support from the unloading orientation to a loading orientation (FIG. 8) in which the central axis of said first gripper means (116) is aligned with the spindle axis while said support is at the inner index station, for effecting operation of said drive means to move said support from the inner index station (142) to the work station (138) with said support (114) in the loading orientation to insert an unfinished workpiece held by said first gripper means into said spindle means, for effecting operation of said drive means to move said support and finished workpiece engaged by said second gripper means back to the inner index station (142), for effecting operation of said drive means (106, 108, 112) to rotate said support from the loading orientation (FIG. 8) to the unloading orientation (FIG. 7) at said inner index station (142), for effecting operation of said drive means (106, 108, 112) to move said support and the finished workpiece engaged by said second gripper means (118) through the opening (56) in said shield means (58) to said outer index station (132) with said support in the loading orientation, for effecting operation of said drive means (106, 108, 112) to rotate said support at the outer index station to the pickup orientation (FIG. 5), and for effecting operation of said drive means to rotate said support from the pickup orientation to a drop off orientation (FIG. 6) at the conveyor station to enable a finished workpiece to be transferred from said second gripper means to said outfeed section of said conveyor means.

14. A method of operating a machine tool having a spindle assembly (26) with an axis (28) which extends outwardly through a work area (66) in which a work station (138) is disposed along the spindle axis adjacent to the spindle assembly, an inner index station (142) is disposed along the spindle axis outwardly of the work station, a conveyor station (134) is disposed along the spindle axis outwardly of the inner index station, an outer index station (132) is disposed along the spindle axis outwardly of the conveyor station, a shield (58) having an opening (56) therein is disposed between the inner index station and a conveyor (50) at the conveyor station, and a workpiece loading and unloading assembly (46) includes a support (114) on which first and second grippers (116, 118) are mounted at spaced apart locations, said method comprising the steps of moving the support (114) to the outer index station (132), rotating the support at the outer index station to a pickup orientation (FIG. 5) in which a central axis of the first gripper (116) is aligned with an unfinished workpiece at the conveyor station (134), moving the first gripper into engagement with the unfinished workpiece at the conveyor station while the support is in the pickup orientation, moving the support and the unfinished workpiece engaged by the first gripper back to the outer index station, rotating the support at the outer index station to an unloading orientation (FIG. 7) in which a central axis of the second gripper (118) is aligned with the spindle axis (28), moving the support and an unfinished workpiece engaged by the first gripper (116) through the opening (56) in the shield (58) to the work station (138) with the support in the unloading orientation, gripping a finished workpiece held by the spindle assembly (26) with the second gripper (118), moving the support to the inner index station (142) with the finished workpiece held by the second gripper (118) and the unfinished workpiece held by the first gripper (116), rotating the support at the inner index station to a loading orientation (FIG. 8) in which the central axis (120) of the first gripper is aligned with the spindle axis (28), moving the support from the inner index station to the work station with the support in the loading orientation to engage the unfinished workpiece held by the first gripper with said spindle assembly, disengaging the first gripper (116) from the unfinished workpiece engaged by the spindle assembly, moving said support and the finished workpiece engaged by the second gripper (118) back to the inner index station, rotating the support at the inner index station from the loading orientation (FIG. 8) to the unloading orientation (FIG. 7) in which the central axis of the second gripper is aligned with the spindle axis, moving the support and the finished workpiece engaged by the second gripper back through the opening (56) in the shield to the outer index station (132), rotating the support at the outer index station to the pickup orientation (FIG. 5) in which a central axis of the first gripper (116) is aligned with a succeeding unfinished workpiece, moving support from the outer index station to the conveyor station (134) with the support in the pickup orientation, engaging the succeeding workpiece at the conveyor station with the first gripper (116) while the support is in the pickup orientation, rotating the support at the conveyor station from the pickup orientation to a drop off orientation (FIG. 6) in which the support is angularly offset from the pickup orientation, and transferring the finished workpiece from the second gripper (118) to a conveyor (50) at the conveyor station while the support is in the drop off orientation.

15. A method as set forth in claim 8 wherein said steps of moving the support (114) and first and second grippers (116, 118) through an opening (56) in the shield (58) with the second gripper (188) aligned with the spindle axis (28) and gripping a finished workpiece held by the spindle (26) with the second gripper (118) include moving the support (114) and first and second grippers (116, 118) along a linear path which extends from a location on a first side of the shield (58) opposite from the spindle (26), through the opening (56) in the shield to a location adjacent to the spindle with the second gripper (118) aligned with the spindle axis (28).

16. A method as set forth in claim 8 wherein said step of rotating the support (114) about a second axis (126) to move a second one of the grippers into axial alignment with the spindle is performed with the support and first and second grippers (116, 118) disposed on a side of the shield (58) opposite from the spindle (26) and with the support and first and second grippers spaced from the opening (56) in the shield prior to performance of said step of moving the support and first and second grippers through an opening (56) in the shield (58).

17. A method as set forth in claim 8 further including the steps of rotating the support (114) about the second axis (126) to move the first gripper (116) into axis alignment with the spindle after performing said step of disengaging the finished workpiece from the spindle (26) and prior to performance of said step of gripping the unfinished workpiece held by the first gripper (116) with the spindle, disengaging the first gripper (116) from the unfinished workpiece after performing the step of gripping the unfinished workpiece held by the first gripper with the spindle, thereafter, rotating the support about the second axis to move the second gripper (118) into axis alignment with the spindle, and moving the support (114) and first and second grippers (116, 118) back through the opening (56) in the shield (58) with the finished workpiece held by the second gripper (118) and with the second gripper aligned with the spindle axis (28).

18. A method as set forth in claim 17 wherein said step of moving the support (114) and first and second grippers (116, 118) through an opening in the shield with the unfinished workpiece held by the first gripper (116) and with the second gripper aligned with the spindle axis includes moving the support (114) and first and second grippers (116, 118) in a direction toward the spindle (26) along a linear path which is parallel to the spindle axis (28) from a location on a side of the shield (58) opposite from the spindle (26), through the opening (56) in the shield, to a location adjacent to the spindle with the second gripper aligned with the spindle axis (28), said step of moving the support (114) and first and second grippers (116, 118) back through the opening in the shield (58) with the finished workpiece held by the second gripper (118) and with the second gripper aligned with the spindle axis (58) includes moving the support (114) and first and second grippers (116, 118) in a direction away from the spindle (26) along the linear path which is parallel to the spindle axis (28) from a location adjacent to the spindle (26), through the opening (56) in the shield (58) to a location on the side of the shield opposite from the spindle with the second gripper aligned with the spindle axis (28).

19. An apparatus for sequentially machining a plurality of workpieces, said apparatus comprising a base (24), spindle means (26) connected with said base for sequentially gripping workpieces and rotating a gripped workpiece about a spindle axis (28) which extends from an outer end of said spindle means, a plurality of stations (132, 134, 138, 142) disposed in a linear array along the spindle axis, said plurality of stations including a work station (138) disposed adjacent to the outer end of said spindle means, a conveyor station (134) disposed along the spindle axis outwardly of said work station, and an outer index station (132) disposed along the spindle axis outwardly of said conveyor station, conveyor means (50) for conveying unfinished workpieces to said conveyor station (134) and for conveying finished workpieces from said conveyor station, shield means (58) disposed between said conveyor means (50) and said work station (138) for blocking materials moving away from a workpiece while the workpiece is being rotated by said spindle means (26), said shield means including means for at least partially defining an opening (56) through which the spindle axis (28) extends, workpiece loading and unloading means (46) for engaging an unfinished workpiece at said conveyor station (134), for moving the unfinished workpiece along a linear path extending parallel to the spindle axis (28) from the outer index station (132) through the conveyor station (134) and through the opening (56) in said shield means (58) to said work station (138), for engaging a finished workpiece gripped by said spindle means (26), for moving the finished workpiece along the linear path through the opening (56) in said shield means (58) and through the Conveyor station (134) to said outer index station (132), and for moving the finished workpiece from the outer index station (132) to the conveyor station (134).

20. An apparatus as set forth in claim 19 wherein said workpiece loading and unloading means includes a movable support (114) and first and second gripper means (116, 118) mounted at spaced apart locations on said support for gripping workpieces, said first and second gripper means having central axes (120, 122) which extend parallel to the spindle axis (28), second drive means (106, 108) for moving said support (114) along the linear path extending parallel to the spindle axis (28) with the central axis of one of said gripper means (116 or 118) aligned with the spindle axis during movement of the unfinished workpiece along the linear path extending parallel to the spindle axis (28) from the outer index station (132) through the conveyor station (134) and opening (56) in said shield means (58).

21. An apparatus as set forth in claim 20 wherein said second drive means (106, 108) is operable to move said support (114) along the linear path extending parallel to the spindle axis with the central axis of one of said gripper means (116 or 118) aligned with the spindle axis (28) during movement of the finished workpiece along the linear path extending parallel to the spindle axis (28) through the opening (56) in said shield means (58) and though the conveyor station (134) to said outer index station (132).

22. An apparatus as set forth in claim 21 wherein said second drive means (106, 108) includes means (112) for rotating said support (114) about a second axis (126) which extends parallel to the spindle axis (28) when said support is at the outer index station (132) and work station (138) to move said first and second gripper means between a position in which the central axis (120) of said first gripper means (116) is aligned with the spindle axis (28) and a position in which the central axis (122) of said second gripper means (118) is aligned with the spindle axis (28).

23. An apparatus as set forth in claim 22 wherein the central axes (120, 122) of said first and second gripper means (116, 118) are offset relative to each other about the second axis (126) by an accurate distance of less than 90 degrees.

24. An apparatus as set forth in claim 19 wherein said workpiece loading and unloading means includes a movable support (114) and first and second gripper means (116, 118) mounted at spaced apart locations on said support for gripping workpieces, said first and second gripper means having central axes (120, 122) which extend parallel to the spindle axis (28), second drive means (106, 108) for moving said support (114) along the linear path extending parallel to the spindle axis (28) with the central axis of one of said gripper means (116 or 118) coincident with the spindle axis during movement of the finished workpiece along the linear path extending parallel to the spindle axis (28) through the opening (56) in said shield means (58) and conveyor station (134).

* * * * *